United States Patent Office  3,414,600
Patented Dec. 3, 1968

3,414,600
ORGANOTRICARBONYL FERRATES AND
THE PREPARATION THEREOF
Pierre Jean Antoine Chabardes, Pierre Gandilhon, and
Charles Camille Dominique Grard, Lyon, and Michel
Pierre François Thiers, Brignais, France, assignors to
Rhone-Poulenc S.A.
No Drawing. Filed Aug. 8, 1966, Ser. No. 570,700
Claims priority, application France, Aug. 16, 1965,
28,441
18 Claims. (Cl. 260—439)

This invention relates to novel organometallic compounds, and more specifically, to compounds resulting from the reaction of transition-metal carbonyls, that is, iron carbonyls, with certain substituted olefins.

Many linear and cyclic olefins, diolefinic, polyolefinic, and acetylinic compounds have been reacted with iron carbonyls, to form transition complexes, in which iron is bound to the organic moiety by a π-bond. Examples of these complexes have been reported, for instance, by Chatt and Duncanson, J. Chem. Soc. (1953) 2939, by Leto and Cotton, J. Am. Chem. Soc., 81, 2970 (1959), and be Greenfield et al., J. Am. Chem. Soc., 78, 120 (1956).

Much less is known about the complexes formed by reaction of iron carbonyls with olefins in which an activating group is present in the position α to the double bond. Kettle and Orgel, Chemistry and Industry, 49 (1960), have reported a product of formula Fe(CO)$_4$-CH$_2$=CHCN, from iron carbonyl and excess acrylonitrile, under the action of sunlight. A product of empirical formula Fe(CO)$_3$(CH$_2$=CHCN)$_2$ has been reported by Schrauzer, Berichte, 94, 644 (1961), but has not been obtained pure. It is prepared by reaction of iron carbonyl, of formula Fe$_3$(CO)$_{12}$, with acrylonitrile. It is characterized by a π bond between the olefinic compound and the iron.

To our knowledge, reactions between olefinic compounds containing an activating group in the position α to the double bond, and iron carbonyls, involving addition to the double bond, and resulting in saturated complexes, are not known in the art. The object of this invention is to provide novel organometallic compounds containing iron which are completely saturated.

Another object of this invention is to prepare the novel compounds of the invention, by methods which are simple and economical, and in good yields.

The novel organometallic compounds of this invention are saturated and have the general Formula I, shown below.

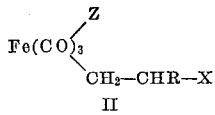

I in which X stands for a functional group such as —CN, —CHO, —COOH, or the carbalcoxy group, R stands for an hydrogen atom or a lower alkyl radical, and Y stands for an hydrogen or an alkali metal atom, or the ammonium radical, or a radical such as

—CH$_2$—CHR$_1$—X$_1$ in which R$_1$ and X$_1$ are the same as R and X defined above. Both R and R$_1$ on one hand, and X and X$_1$ on the other hand, may be the same or may be different.

The compounds of general Formula II below, are the same as the compounds of Formula I above, but represent the specific embodiment in which Y is an alkali metal atom or the ammonium radical. In Formula II, Y has been replaced by Z, as shown below:

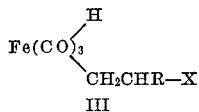

II in which Z stands for an alkali metal atom or the ammonium radical and R and X have the same meaning as defined above. Compounds II are alkali metal or ammonium organotricarbonyl ferrates.

The method of preparation of compounds of Formula I consists of reacting an α-substituted olefin of formula CH$_2$=CR—X, in which X and R have the same meaning as indicated above, with an iron carbonyl hydride, the latter in an aqueous basic solution. The iron carbonyl hydrides are obtained by reaction of iron pentacarbonyl with an inorganic or organic base, in an aqueous medium. The reaction of an olefin containing an activating group in the α position, with an iron pentacarbonyl hydride in an aqueous basic solution, in accordance with this invention, is conducted in an inert atmosphere and in general, at room temperature. In view of the fact that the reaction is exothermic, external cooling is frequently necessary. Carbon monoxide resulting from the decomposition of the iron carbonyl hydride, is evolved.

When the reaction described above is conducted from iron pentacarbonyl with an alkali metal hydroxide or with ammonium hydroxide, and the product reacted with the α-substituted olefin, the resulting product, has formula II, in which Z stands for the alkali metal or the ammonium radical of the basic reagent which has been reacted with iron pentacarbonyl to form the hydride.

According to a preferred embodiment of the invention, it is not necessary to prepare first the iron pentacarbonyl hydride and then react the latter with the α-substituted olefin, but it is possible to form the iron pentacarbonyl hydride in situ. More specifically, iron pentacarbonyl and the olefin are added to an aqueous solution of an alkali hydroxide or ammonium hydroxide and the reaction mixture is kept under good stirring, while cooling externally. The desired product of Formula II is formed, in the alkaline medium in which the reaction is conducted.

The products obtained as described above, the alkali metal or ammonium organotricarbonyl ferrates of Formula II, in which Z in an alkali metal or the ammonium radical, give by reaction with an inorganic or organic acid, for instance hydrochloric or acetic acid, the corresponding hydride of Formula III shown below. Manifestly compounds of Formula III are the same as compounds of Formula I, in which Y is an hydrogen atom.

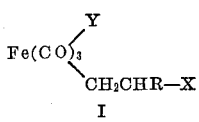

III

The reaction of a compound of formula III with an α-substituted olefin of formula CH$_2$=CR$_1$X$_1$ gives a product of Formula IV according to the equation below:

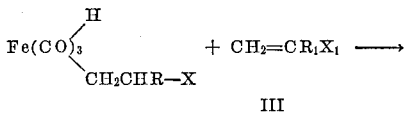

III

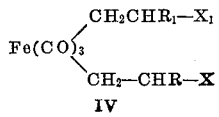

IV

The olefin in the Equation IV above CH$_2$=SR$_1$X$_1$, may be the same as the olefin used to prepare compound III, or may be different. R and R₁ in Formula IV stand for an hydrogen atom or a lower alkyl group. In Formula IV, X and $X_1$ represent an activating substituent such as —CN, COOH, carbaloxy or —CHO, as already defined in Formula I. Compounds of Formula IV, manifestly, are the same as compounds of Formula I, in which Y is a radical —$CM_2$—$CHR_1$—$X_1$.

According to another embodiment of the invention, the compounds of Formula IV may be prepared by reaction of the compounds of Formula II with a compound of Formula Hal—$CH_2CHR_1X_1$ in which $R_2$ and $X_2$ have the same meaning as defined above, and "Hal" stands for chlorine, bromine or iodine, in accordance with the equation below:

II + Hal—$CH_2CHR_1X_1$

↓

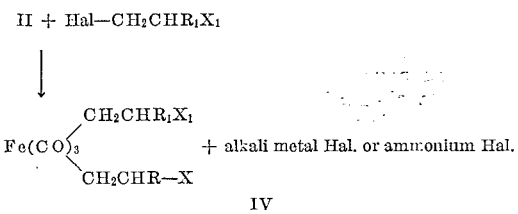

IV

According to a preferred embodiment of the invention, "Hal." above is a chlorine atom.

Compounds of Formula IV in which $R_1$ is the same as R and $X_1$ is the same as X, may be prepared by reaction of an α-substituted olefin of formula $CH_2$=CR—X with a complex of the hydride of iron carbonyl and a tertiary amine of formula $H_2Fe_3(CO)_{11}NR_3$. The latter complexes are prepared by heating iron tetracarbonyl or pentacarbonyl with a tertiary amine, $NR_3$, in an aqueous medium. For instance, the complex $H_2Fe_3(CO)_{11}$-$N(C_2H_5)_3$ may be prepared by reaction of iron pentacarbonyl and triethylamine, in an aqueous medium. When the triethylamine-containing complex of the above formula reacts with an α-substituted olefin, of formula $CH_2$=CRX, the compound of Formula IV is obtained. According to the reaction, one mole of compound IV is formed per each mole of the tertiary amine complex, which is decomposed.

The α-substitued olefins, within the scope of this invention, may be, for instance, acrylonitrile, methacrylonitrile, acrolein, acrylic and methacrylic esters of lower alcohols.

The novel compounds of Formula I above are solid products, usually colored, and insoluble in water. They are stable, and are useful as intermediates in many synthetic preparations and as catalysts in oligomerization reactions. They may also be utilized as catalysts in the polymerization of vinyl monomers.

The following examples are described in detail below, for the purpose of better illustration of this invention.

Example 1

This example illustrates the preparation of a compound of Formula II by first forming the hydride of iron pentacarbonyl, and then reacting with the α-substituted olefin. Twenty cubic centimeters of iron pentacarbonyl, and 100 cc. of aqueous solution containing 33.6 g. of potassium hydroxide, are placed in a 200 cc. flask, under a nitrogen atmosphere. The mixture is stirred with a magnetic stirrer for a period of six hours, during which time its acquires a yellow-orange color. Acrylonitrile, 100 cc., stabilized with 50 parts of ammonia per million is added, while maintaining the temperature at 20° C., with a cold water bath. The gas which is evolved, collected in a vessel containing water, amounts to 3680 cc. It contains 92% carbon monoxide. After the evolution of gas has ceased, stirring is stopped, the organic layer is decanted and concentrated under vacuum at 0.2 mm. of mercy. The product is a deep yellow viscous oil, which is treated with 600 cc. of a mixture of acetone-ether containing 10% of ether by volume The resulting precipitate is filtered, washed with ether and dried. The product is a powder of light ochre color. Yield: 22.82 g. (64% on the the basis of the iron pentacarbonyl used).

Evidence for the structure of the potassium 2-cyanoethyl tricarbonyl ferrate, resides in the elementary analysis and in the infrared spectrum. The latter shows the absence of olefinic double bond, a band at 4.45–4.6μ characteristic of the nitrile group and bands at 4.89–4.99μ and at 5.11μ, which are characteristic of the carbonyl groups.

By substitution of aqueous solutions of sodium hydroxide or lithium hydroxide or ammonium hydroxide for the potassium hydroxide solution, used above in such an amount as to give a reaction mixture of same alkalinity as above, the products obtained are the sodium, lithium or ammonium 2-cyanoethyl tricarbonyl ferrate respectively, in 75%, 54% and 30.5% yield, respectively.

Example 2

This example illustrates the preparation of the hydride, that is, a compound of Formula III from the potassium salt, that is, from a compound of Formula II.

Ten cubic centimeters of iron pentacarbonyl, 50 cc. of an aqueous solution containing 33.60 g. of potassium hydroxide, 100 cc. of acrylonitrile, are reacted in the same apparatus and under the same experimental conditions as in the preceding example. After the evolution of gas ceases, the organic layer is decanted, concentrated and filtered. Addition of 200 cc. of an aqueous solution of 1 N hydrochloric acid gives a yellow precipitate, which is let stand under stirring two hours, and then it is filtered and washed to neutarlity. This precipitate is dried under vacuo, at a pressure of 0.2 mm. of mercury, over phosphoric anhydride for a period of eight hours. The yellow powder is 2-cyanoethyl tricarbonyl iron hydride. Yield: 22.43 g. (84.5% based on the iron pentacarbonyl used).

Similar results are obtained by using lithium hydroxide, sodium hydroxide or aqueous ammonium hydroxide instead of potassium hydroxide.

Example 3

This example illustrates the preparation of a compound of Formula IV by reaction of a compound of Formula II with a substituted alkyl halide.

A stainless steel autoclave is charged with 4 g. of potassium 2-cyanoethyl tricarbonyl ferrate, prepared according to Example I, and with 10 cc. of β-chloropropionitrile. After heating five hours at 60° C., the reaction mixture is cooled, filtered, washed with water to pH 7, then with ethanol and ether, and dried under vacuo, at a pressure of 0.2 mm. of mercury. The product has a bright yellow color. Yield: 2.86 g. (67.5%).

From the elementary analysis and the infrared spectrum, it is concluded that the product has the assigned structure. The infrared spectrum indicates no olefinic double bond, the presence of nitrile bands, at 4.49 and 4.56μ and carbonyl bands at 4.86μ, 4.96μ and 5.13μ.

Example 4

Forty-five cc. of acrylonitrile, 12.4 g. of iron 2-cyanoethyl tricarbonyl hydride prepared according to Example 2, and moistened with 3 cc. of water, are placed in an autoclave, at room temperature and let stand at the same temperature 15 hours. The reaction mixture is treated as in the preceding example. Iron bis-(2-cyanoethyl)-tricarbonyl is obtained. Yield: 9.3 g.

Example 5

Iron 2-cyanoethyl tricarbonyl hydride, 4.4 g., prepared according to Example 2, is reacted with 10 cc. of methyl acrylate under the same conditions as in Example 4. The solid product after washing and drying, gives 4.1 g. of a yellow powder.

Infrared analysis shows the absence of olefinic double bonds, but shows the presence of bands at 4.48–4.52μ indicative of the nitrile group, bands at 4.76, 4.92 and 5.08μ indicative of the carbonyl groups and a band at 5.90μ indicative of the ester group. The infrared analysis, coupled with the elementary analysis, confirms the structure of iron-(2-cyanoethyl) carbomethoxyethyl-tricarbonyl.

Example 6

A mixture of 300 g. of acrylonitrile, stabilized with 50 parts of ammonia per million, and 231 g. of the hydride of triethylammonium undecacarbonyl triferrate of formula $Fe_3(CO)_{11}H_2N(C_2H_5)_3$ are placed in a one-liter autoclave, and stirred at room temperature for a period of 15 hours. After cooling and removal of entrapped gaseous material, a yellow solution is obtained, 480 cc., which contains a precipitate in suspension. The iron pentacarbonyl content of the solution is 80 cc. determined by chromatography. The solution is freed of volatile products by distillation at 15 mm. of mercury, and at temperature not exceeding 40° C. To the distillation residue are added 200 cc. of freshly distilled acrylonitrile in the presence of 500 cc. of an aqueous solution of 1 N HCl. A bright yellow precipitate separate slowly, which is filtered and washed with water to neutrality and then with ethanol and ether. The product, dried over phosphoric anhydride at 0.2 mm. of mercury, is iron bis(2-cyanoethyl)-tricarbonyl. Yield: 96 g. (96.5%, based on the amount of the hydride complex used). The infrared spectrum is identical to that of the product prepared according to Example 3.

The volatile material removed by distillation as described above, is collected in a mixture of solid carbon dioxide and acetone, at −78° C. It contains iron pentacarbonyl which is recovered by extraction with water followed by distillation. Yield: 61 g. The recovered product may be recycled for the preparation of the hydride complex starting material.

Example 7

Two and one-half cubic centimeters of iron pentacarbonyl, 30 cc. of acrylonitrile and 8 cc. of 33.6% aqueous potassium hydroxide solution are placed in autoclave of 125 cc. capacity, and kept under agitation at room temperature for a period of six hours. After removal of the gaseous products from the autoclave, the reaction mixture is treated as in Example 1. The product is potassium 2-cyanoethyl tricarbonyl ferrate. Yield: 2.65 g. (72%). Infrared analysis confirms the assigned structure.

It is manifest that by this invention novel organometallic compounds are provided by the reaction of iron carbonyls and olefins, which are different from other complexes known in the art and which do not contain a double bond, but contain a functional group, such as —CN, —CHO, —COOH, or a carbalcoxy group. Those skilled in the art will readily visualize that, although only seven examples have been described in detail, several variations of the examples are possible, without departing from the spirit of the invention, which is to be limited only by the scope of the appended claims.

What is claimed is:

1. An organometallic compound of formula

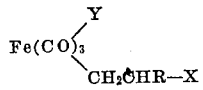

wherein X is a member selected from the group consisting of —CN, —CHO, —COOH, and carbalcoxy groups, R is a member selected from the group consisting of hydrogen and lower alkyl radical, and Y is a member selected from the group consisting of hydrogen, an alkali metal, the ammonium radical and a radical of formula —$CH_2CHR_1X_1$ in which $R_1$ and $X_1$ are defined as R and X.

2. A compound according to claim 1 wherein X and $X_1$ are the same, and R and $R_1$ are the same.

3. A compound according to claim 1 wherein R and $R_1$ are the same, and X and $X_1$ are different.

4. A compound according to claim 1 wherein R and $R_1$ are different, and X and $X_1$ are the same.

5. A compound according to claim 1 wherein Y is a member selected from the group of alkali metal and ammonium radical.

6. A compound according to claim 1 wherein R is a member of the group consisting of hydrogen and lower alkyl, and Y is a radical of formula —$CH_2CHR_1X_1$ in which $R_1$ and $X_1$ are defined as R and X.

7. A compound according to claim 6, wherein R is hydrogen, X is —CN, and Y is —$CH_2$—$CH_2$—$COOCH_3$.

8. A compound according to claim 1 wherein Y is hydrogen.

9. The process for the preparation of a compound according to claim 1 which comprises the steps of:

(1) reacting iron pentacarbonyl with a member of the group consisting of organic and inorganic bases in an aqueous medium whereby an iron carbonyl hydride is formed, and (2) reacting said hydride with an olefin of formula $CH_2$=CRX in which R is a member selected from the group consisting of hydrogen and lower alkyl group and X is a member selected from the group consisting of —CN, —CHO, —COOH, and carbalcoxy, until the evolution of carbon monoxide ceases and recovering said product from the reaction mixture.

10. The process according to claim 9 wherein said base is a member of the group of alkali metal hydroxide and ammonium hydroxide.

11. The process for the preparation of a compound according to claim 5 which comprises adding iron pentacarbonyl and an olefin of formula $CH_2$=CRX wherein X is a member of the group of —CN, —CHO, —COOH and carbalcoxy, to an aqueous solution of a member of the group consisting of alkali hydroxide and ammonium hydroxide.

12. The process for the preparation of a compound according to claim 8 which comprises reacting iron pentacarbonyl with an olefin of formula $CH_2$=CRX wherein R is a member selected from the group consisting of hydrogen and lower alkyl group and X is a member selected from the group consisting of —CN, —CHO, —COOH, and carbalcoxy, in the presence of an aqueous solution containing a member selected from the group consisting of alkali hydroxide and ammonium hydroxide, until the evolution of carbon monoxide ceases, and an aqueous and an organic layer are formed, separating said organic layer, acidifying, and recovering said product from said acidified layer.

13. The process for the preparation of a compound according to claim 6 which comprises reacting a compound of formula:

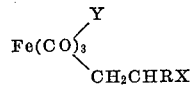

in which Y is a member selected from the group consisting of alkali metal and the ammonium radical, with a compound of formula $Hal.CH_2CHR_1X_1$ wherein Hal. is a member of the group consisting of Cl, Br and I and $R_1$ and $X_1$ are defined as R and X, respectively.

14. The process for the preparation of a compound according to claim 6 which comprises reacting a compound of formula:

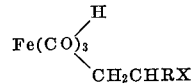

wherein R is a member of the group consisting of hydrogen and lower alkyl and X is a member of the group consisting of —CN, —CHO, —COOH, and carbalcoxy, with an olefin of formula $CH_2$=$CR_1X_1$ in which $R_1$ and $X_1$ are defined as R and X.

15. The process for the preparation of a compound according to claim 6 which comprises the steps of:
   (1) reacting a compound which is a member of the group of $Fe(CO)_4$ and $Fe(CO)_5$ with a tertiary amine, in an aqueous medium until the complex $H_2Fe_3(CO)_{11}NR_3$ is formed, and
   (2) reacting said complex with an olefin of formula $CH_2=CR-X$ wherein R is a member selected from the group consisting of hydrogen and lower alkyl and X is a member selected from the group consisting of —CN, —CHO, —COOH and carbalcoxy.

16. The process according to claim 14 wherein said olefin is a member of the group consisting of acrylonitrile, methyl acrylate, methacrylonitrile, acrolein, acrylic and methacrylic esters of lower alcohols.

17. The process according to claim 9 wherein said olefin is a member of the group consisting of acrylonitrile, methyl acrylate, methacrylonitrile, acrolein, acrylic and methacrylic esters of lower alcohols.

18. The process according to claim 13 wherein said $Hal.CH_2CHR_1X_1$ is $ClCH_2CH_2CN$ and the reaction is conducted in a sealed vessel at 60° C.

References Cited

UNITED STATES PATENTS 3,351,648  11/1967  Weiss et al. _____ 260—439

OTHER REFERENCES

Goetz et al., J. Am. Chem. Soc., vol. 85 (1963), pp. 2782–4.

TOBIAS E. LEVOW, *Primary Examiner.*

A. P. DEMERS, *Assistant Examiner.*